Sept. 20, 1960     L. C. EICKMAN     2,952,918
GAUGING DEVICE
Filed Feb. 11, 1953     2 Sheets-Sheet 1
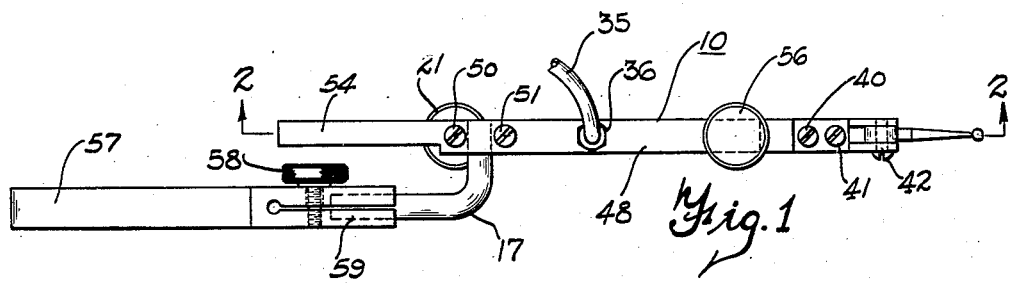
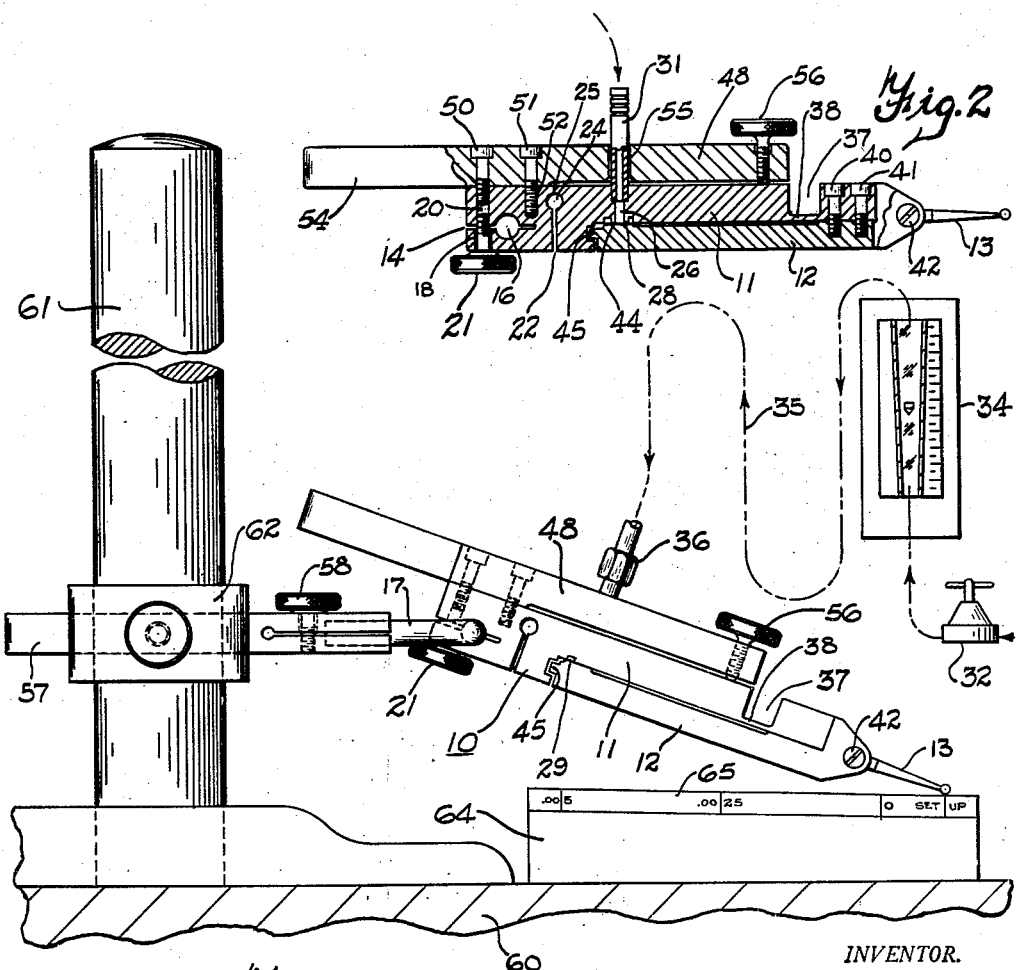
INVENTOR.
L. C. Eickman
BY Edward J. Noif
atty.

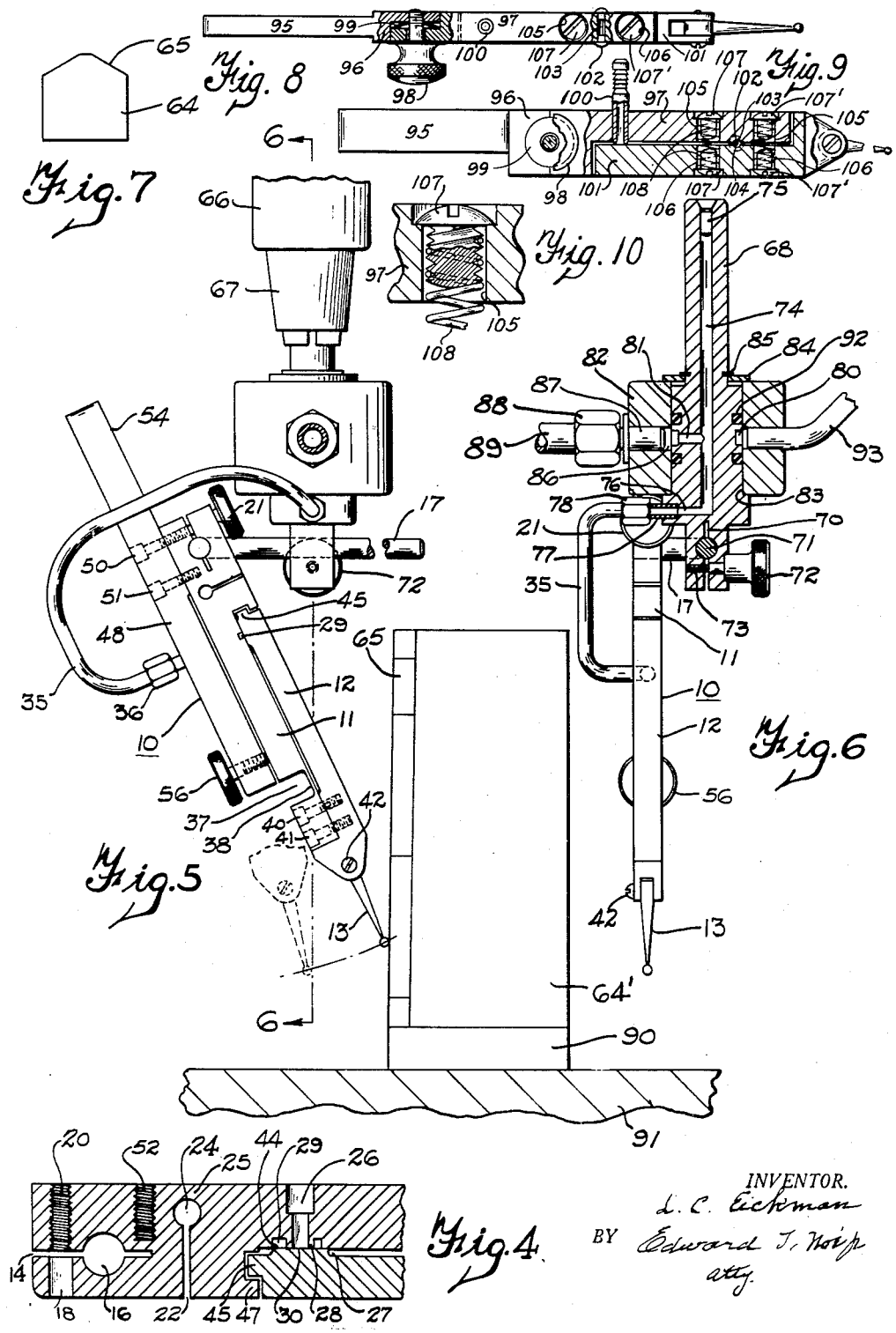

United States Patent Office 2,952,918
Patented Sept. 20, 1960

2,952,918

GAUGING DEVICE

Lowell Carl Eickman, Dayton, Ohio, assignor, by mesne assignments, to The Sheffield Corporation, a corporation of Delaware Filed Feb. 11, 1953, Ser. No. 336,295

8 Claims. (Cl. 33—169)

This invention relates to dimension gauging apparatus and the like.

It is an object of this invention to provide a gauging head having a support means for mounting the head in a selected position, and adapted for use with an air supply and an air gauge, wherein the flow from a fluid leakage orifice outlet is controlled by swinging movements of a work contacting element, the head being simple and rugged in construction and relatively easy and cheap to manufacture.

A further object is to provide a gauging head of the character mentioned which includes an elongated carrying member supporting an orifice outlet and an extended work contacting element swingingly carried by the member at one end thereof and on an axis transverse the carrying member for control of said orifice, which head, because of the configuration of its components, is adapted for insertion into holes of small diameter or between closely spaced surfaces or the like.

A further object is to provide a gauging head of the character mentioned wherein the orifice controlling component is the only moving element in the head, and is resiliently mounted on the carrying member by a simple springlike connection, so that repeated accurate measurements can be made without hysteresis error because the head is subtsantially unitary, has only two major parts, and because there is no lost motion or play in its single movable measuring component or its supporting connection.

A further object is to provide a gauging head of the character mentioned wherein the resilient connection for the orifice controlling component is provided by a reduced section in the unitary carrying member thus simply providing a connection which is frictionless and has no play therein.

A further object is to provide a fine adjustment means for a gauging head of the character mentioned which includes a means for biasing the outer end of the carrying member about a resilient inner connection therein.

A further object is to provide a support for a gauging head of the character mentioned which is adapted for mounting in a rotary fixture, for locating hole centers and the like which includes a sliding connection for air supply to the leakage orifice during fixture rotation.

A further object is to provide a form of gauging head of the character mentioned wherein the carrying member includes an angularly adjustable connection.

A further object is to provide a form of gauging head of the character mentioned wherein the extended work contacting element is supported from the carrying member by a mechanical pivot and held in the carrying member by spring means.

A further object is to provide a gauging head of the character mentioned which is adapted for fast and simple calibration.

It is an object of this invention to provide a gauging head involving a controlled leakage orifice which is particularly adapted for use in height measurements in conjunction with surface plates or the like.

Other objects and advantages of the invention will be apparent from the following description, the appended claims and the accompanying drawings in which:

Figure 1 is a top plan view of a gauging head embodying the present invention and showing its association with an adjustable mounting bar, Figure 2 is a view of the gauging head in partial central vertical section taken along the line 2—2 of Figure 1, Figure 3 is a view of the gauging head showing its mounting for height measurement or the like and a schematic diagram of an air circuit to the gauging head, Figure 4 is an enlarged portion of Figure 2 showing the orifice outlet and its associated structure in more detail, Figure 5 shows the gauging head adapted for mounting in a vertical rotary fixture and its association with a vertical set-up block, Figure 6 is a view looking to the left in Figure 5 and showing the support structure and sliding air connecting means in section along line 6—6 of Figure 5, Figure 7 is an end view of the set-up block of Figure 3, Figure 8 is a top plan view of another form of gauging head involving the present invention, shown in partial section, Figure 9 is a view in partial central vertical section of the form shown in Figure 8, and Figure 10 is a detail sectional view showing the spring tensioning device.

Gauging heads of the character herein involved are generally used as height gauges in conjunction with a surface plate supporting means. They are used for determining dimensions and locations by comparison with masters, gauge blocks and the like or used to determine flatness, parallelism, concentricity, and other geometrical characteristics of parts suitably supported.

Height gauges of the conventional character have either been mechanical devices including a dial arrangement mounted on a post and a base and adapted for use in conjunction with a surface plate or have been electrical devices controlling an electrical indicator of some sort. These height gauges have had serious disadvantages limiting their use when precise measurements are required. Generally they are of such delicate construction as to render them subject to accidental damage. They have been subject to hysteresis error in their indications, producing jumping indications and failing to repeat accurately due to friction, backlash or windup which are necessarily prevalent in mechanical types of instruments. These devices have ordinarily had a work contacting arm that can be adjusted to various angles on the main body portion of the height gauge head and manufacturers have had to supply correction charts so that instrument indications can be corrected for any deviation of this arm from a particular reference angle with respect to the head. However, operators after a period of time either lose the charts or don't bother using them and this, of course, results in erroneous measurements. Gauging heads operating with electrical devices of course have inaccuracies caused by changes in temperature and they are also subject to deterioration of the electrical components, inaccuracies due to voltage variation as well as mechanical errors. Ordinarily the gauge heads that have been used for height indication purposes have not been so made as to be conveniently used for exploring small holes to any substantial depth because of interference caused, for instance, by the dial faces themselves.

In accordance with the present invention the inaccuracies that have been mentioned as existing in height gauges of the conventional character have been avoided. The present invention embodies a body member that is considerably elongated and capable of exploring holes or the like to a substantial depth. It has no hysteresis or windup error and is sturdily constructed so as to be capable of withstanding severe shocks without damage. It is very accurately repetitive and gives a positive repeat reading regardless of directional approach. It has no warmup period and no backlash. Because it involves control of an air leakage orifice the gauging head herein presented is adapted for use with any standard air flow or pressure indicating unit and has the magnification capabilities of a wide range of such existing units. It has a short work contacting arm that can be adjusted on the work head itself to various angles for conveniently reaching surfaces that might ordinarily be difficult to contact. This work contactor may be set with respect to the gauging head at any desired angle. Used in conjunction with an adjustable indicator and the disclosed setup block, by moving the work contacting stylus along the setting block and making corresponding adjustments of the indicator at the calibrated points, a magnification check and scale setting procedure is provided which also automatically corrects for any relative angularity between the work contacting stylus and the gauging head of this invention.

The drawings show in detail an illustrative embodiment of such a gauging head, adapted for such uses, embodying the features of the present invention.

Referring more particularly to the drawings, in which like parts are designated by the same reference numerals in each of the several figures, the numeral 10 designates generally an exemplary gauging head embodying the present invention. The three components associated most essentially with the measuring function of the gauging head are a carrying member or bar 11 having an orifice outlet on the surface thereof, a leakage controlling arm 12 connected to the carrying arm at its outer end by a flexible connection and having a leakage orifice controlling portion at its inner end, and an adjustable work contactor 13 attached to the outer end of the controlling arm 12. When the work contactor 13 is displaced by engagement with a workpiece surface or a gauge block it swings the leakage controlling arm 12 about an axis transverse the carrying member 11 which is suitably fixed in position, moving the inner end of the leakage unit controlling arm 12 relative to the orifice outlet and controlling the leakage flow therefrom in accordance with movement of the work contactor. By gauging the amount of flow of air or other fluid through the orifice the size or dimension of the part contacted will be indicated.

The carrying member 11 is formed as an integral element in the embodiment of the invention as here shown. At its inner end this element 11 has cut transversely therethrough a slot 14 and a hole 16 for the insertion of a clamping rod 17 thereinto. The member 11 has a vertical hole through it below the slot 14 and is threaded through above the slot 14 as shown at 20. A knurled adjusting screw 21 is screwed into the threaded portion 20 for tightening the inner end of the member 11 about the clamping rod 17 when it is positioned about the axis of the hole 16 as desired. Adjacent its inner end the member 11 has a vertically disposed slot 22 of substantial depth cut therein joining a transverse hole 24 leaving a reduced portion at 25 in the member 11 which constitutes a comparatively flexible portion therein adjacent the inner end of the member 11.

Intermediate its length member 11 has a vertical passage 26 therethrough opening through an annular projection 28 forming an outlet orifice opening at 30. Leakage air exhausts radially to an annular depression 27 and out through transverse grooves 29. A tubular connecting element 31 is inserted into the passage 26 and is fixedly seated therein. Noting Figure 3 in particular, air is supplied for gauging purposes through a regulator 32, an air flow gauge 34, a tube 35 which is clamped to the connecting element 31 by a clamping member 36 and flows to the outlet orifice 30 where its flow is controlled in accordance with the position of the arm 12.

The member 11 has a transverse groove of substantial width and depth 37 cut across its surface adjacent its outer end leaving a reduced portion at 38 which forms a resiliently flexible connection and allows movement of the outer end of the carrying member 11 about an axis transverse thereof. The structure can be adapted for use with other flexible connections, if desired.

The leakage controlling arm 12 is connected to the outer end of the member 11 beyond the reduced portion 38 by screws 40 and 41 and extends back along and adjacent the carrying member 11 slightly beyond the outlet orifice 30. A screw 42 is threaded to the outer end of the leakage controlling arm 12 for adjustably clamping a work contactor 13 thereto. A slightly raised land 44 is formed on the inner surface of the arm 12 and is situated in contact with the outlet orifice 30 when the work contactor 13 is not engaging a workpiece or the like. The spacing of this land 44 relative to the annular projection 28 determines the air flow from the outlet orifice 30 in correspondence with movements of the work contactor 13 and results in an indication on the gauging unit 34 of the displacement of the work contactor by the workpiece surface. Referring more particularly to Figure 4, the arm 12 has a tang-like projection 45 cooperating with a ledge 47 on the carrying member 11 situated on one side of the tang 45 in the plane of its swinging movement to limit this movement, thus preventing overstressing of the resilient connection.

Another support means is provided for mounting the carrying member 11 and as shown constitutes a mounting bar 48 fixed to the carrying member by screws 50 and 51 screwed into the member 11 at 20 and 52, respectively. The mounting bar 48 has a rearward extension 54 for clamping in a support means as desired. The tubular connecting element 31 passes through the mounting bar 48 at 55 and has clearance relative thereto to allow free movement between these elements without interference. The mounting bar 48 also serves for fine adjustments of the outer end of the gauging head relative to the inner end thereof whether the carrying arm 11 is supported by the clamping rod 17 or the rearward extension 54 of the mounting bar 48. As can be seen from the drawings the mounting bar 48 is fixed to the carrying member 11 at its inner end and at one side of the comparatively flexible portion 25. This bar 48 extends along one surface of the carrying member 11 and terminates at or near slot 37. An adjusting screw 56 is threaded through the mounting bar 48 and contacts the carrying member 11 adjacent the resiliently flexible portion 38. There is a slight spacing between the carrying member 11 and the mounting bar 48 throughout most of their lengths. It can be seen that adjustments of screw 56 will bias the outer end of the gauge head about the flexible portion 25 away from the bar 48, and will achieve fine adjustments thereof relative to the supported inner end.

The clamping rod 17 can be slidably inserted into an adjustable mounting bar 57 as shown at 59 and fixed thereto by tightening the screw 58. It should be noted that the gauging head 10 can be supported alternatively by the mounting bar 54, the clamping rod 17 alone or the clamping rod 17 in conjunction with the adjustable mounting bar 57 as desired.

Figure 3 shows the gauging head supported by its adjustable mounting bar 57 and clamping rod 17 relative to a surface plate 60 by a column 61 and a clamping fixture 62 for making a height measurement or the like. In using this device for height measurements, after calibration, it is adjusted to the desired height through the use of gauge blocks or a master. The workpiece to be gauged is then substituted and a comparison is made to determine whether the workpiece is within the desired tolerance. The work contactor 13 is shown in Figure 3 touching a set-up block 64, used for calibration, resting on the surface plate 60. This set-up block 64 has an upper surface 65 which slopes slightly and which is calibrated.

In Figures 5 and 6 the gauge head 10 is shown supported in a rotary chuck 66 in a setup for measuring hole concentricity relative to the axis of the chuck. The structure that is particularly shown in Figures 5 and 6 is a support means for the gauge head 10 which will allow its support through the clamping rod 17 in a chuck or rotary holder and which provides for the supply of air through a sliding connection for gauging purposes. The structure for so supporting the gauge head 10 includes a central member 68 having a slot and hole in its lower end at 70 and 71 respectively for receiving the clamping rod 17. A knurled screw 72 is threaded into the central element 68 at 73 for tightening the lower end thereof about the clamping rod 17 in the desired adjusted position. The central member 68 has a reduced portion at one end thereof for insertion into a clamping structure such as a chuck collet 67. Member 68 has a longitudinal passage 74 through a portion thereof closed at its outer end by a plug 75. This passage 74 communicates with a radial passage 76 at the other end of the member 68. Tube 35, which communicates with the outlet orifice, is clamped to an insert 77 and 78. There is an annular groove 80 in the surface of member 68 which communicates with the longitudinal passage 74 through a radial passage 81. Slidably situated about the enlarged portion of the central member 68 is an annular component 82. This component 82 seats on a land 83 in the central member 68 and is retained thereon by a washer 84 and a snap ring 85. Component 82 has a radial passage 86 which communicates with the annular groove 80 in the central member 68. O sealing rings 92 are situated to seal the relatively sliding surfaces of the member 68 and the component 82. An insert 87 in the radial passage 86 is clamped by a clamping element 88 to a tube 89 which communicates with an air supply and an air gauge such as that schematically shown for the embodiment of Figure 3. An angled rod 93 is inserted into the component 82 and engages a stationary portion of the machine to prevent rotation of the component 82. Thus it is seen that the gauge head 10 is supported by the central member 68 in the rotary chuck 66 whereby it may be rotated to determine hole concentricity relative to the axis of the chuck 66 which will hold the tool that is to operate on the hole being checked, or for a like operation, and that structure has been provided through a non-rotating annular component 82 to supply air for gauging purposes.

In this application the gauge head and its support structure are shown associated with a vertically mounted setup gauge block 64 which has a magnetic base 90 for retaining it on the surface 91 of the machine of which the chuck or holder 66 is a part. This block 64' is similar to that disclosed in Figure 3 in that it has a sloped surface which is calibrated for setup purposes.

Figures 8, 9 and 10 illustrate a modification of the present invention. In this modification the carrying member 95 is formed with an inner element 96 and an outer element 97 which are adjustable relative to one another. The inner element has an extension forming a part thereof which is adapted for mounting in a fixture such as that shown at 62 in Figure 3. The two elements 96 and 97 can be relatively adjusted about the axis of a knurled adjusting knob 98 which has a reduced extension which passes through the outer element 97 and a threaded portion which is screwed into the inner element 96 to tighten the elements in adjustably fixed position with a cup-shaped washer 99 interposed between the two elements on the axis of the adjusting knob 98. This feature allows the outer portion of the gauging head to be angularly adjusted relative to the mounting extension of inner element 96 and adapts the gauging head to measure workpiece dimensions which would be inaccessible with a nonadjustable gauge head. The outer element 97 has a tube inserted through it as shown at 100. This tube is adapted at its upper end for connection to an air gauge means as is shown for the other embodiment and extends slightly below the outer element 97 to form a leakage orifice. The work controlled arm 101 is carried from the carrying member 95 and at its inner end is situated for control of flow through the tube 100 in accordance with workpiece dimensions. It has an adjustable work contactor supported at its outer end similar to that disclosed for the previously described embodiment. This arm pivots relative to the outer element 97 about a pin 102 which is seated in opposed grooves 103 and 104 in the outer element 97 and the work controlled arm 101 respectively. This pin 102 has a reduced central portion and enlarged head portions at either end to prevent its axial movement in the grooves 103 and 104. The reduced central portion is provided to reduce the actual frictional contact area between the grooves and the pin. This bearing connection between the outer element 97 and the arm 101 can take several equivalent forms. It could be formed by opposed V grooves across these components with a cooperating pin seated therein or it could take the form of a V projection from one member seated in a more obtuse V groove in the other. There are axially aligned holes 105 and 106 in the outer element 97 and the arm 101, each of which has a shallow counterbored section at its outer end. Screws 107, 107 are seated in the counterbored sections and are threaded in a spring 108. It will be seen that the tightening screws 107, 107 will serve to tension the spring 108. A similar spring tensioning means is situated to the right of the pivot axis in Figure 9 and its corresponding screw elements have been indicated by primed numerals. These tensioning means cooperate to resiliently hold the outer element 97 and the arm 101 together about the pin 102 and, being adjustbale, allow precise adjustments of the force against which workpiece controlled movements of the arm 101 are made. Figure 10 shows in detail the cooperation between a screw 107 and one end of the spring 108. With this arrangement upon shock or dropping of the gauge head the likelihood of breaking or straining of any of the components of the gauge head is reduced because while the arm 101 could be displaced from alignment with outer element 97 against the tension of the springs it could be readily reassembled. Also with this modification it has been found that a limit of movements of the arm 101 is unnecessary because there are no components likely to be permanently strained or injured by such excessive movements of the arm 101 and also because the cooperation of the outer end of the outer element 97 with the adjacent face of the arm 101 is such as to limit such extreme movements until the arm 101 is biased away from the pin 102 against tension of spring 108. This latter modification of Figures 8, 9 and 10 can be utilized for the same purposes and in a like manner as for the modification previously described.

The gauging head of the present invention has many important advantages. Repetitiive and accurate readings are assured with the disclosed device regardless of the direction of work contactor movement because all movements of the work contactor are translated to the control of the orifice outlet through a frictionless elastic hinge. Movements of the work contactor are instantly translated into an accurate magnified movement of the float in the gauge 34 without involving structure which would be subject to friction and backlash and such as would be found in mechanical types of devices, so this gauge head has a zero hysteresis error. Due to its rugged construction this device will not be adversely affected through ordinary bumping or dropping of the device. It should be noted that the arrangement of the components in the disclosed embodiment results in a gauge head which is quite slim, allowing its insertion into holes, slots, grooves or other geometrical features. In this invention an accurate calibration is assured with the angle block setup block provided, used in conjunction with means for setting the amplification and the scale of the gauge 34. A sweep of the work contactor over the setup block not only provides a check of the magnification of the gauge 34 and the scale settings thereof but also automatically corrects for angularity of the work contactor relative to the workpiece surface and such possible errors which might result from measuring movements not normal to the work contactor arm.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging apparatus comprising a work gauging head adapted for physical contact with an object to be measured, means for mounting said head for gauging, said gauging head including a carrying member supported by said mounting means, an outlet orifice on said member and opening through one side thereof, passage means connected to said orifice, a movable arm carried by said carrying member extending closely along the side of said member through which said orifice opens and having a portion thereof adjacent its inner end located in close proximity to said outlet for control thereof, resilient means supporting said arm adjacent its outer end on said member for swinging movement about an axis displaced along said member in one direction from said orifice and a work contactor forming a continuation of said arm in the same direction beyond said axis for movement of the arm about said axis and control of the orifice upon the contact of the work contactor with a workpiece surface, said carrying member having a projection cooperating with the inner end of said arm in the plane of its swinging movement to limit its swinging movement away from said orifice and the side of said member through which it opens.

2. A work gauging head adapted for physical contact with an object to be measured comprising a carrying bar, means for supporting said carrying bar adapted for mounting in a fixture, an outlet orifice on said bar, passage means connected to said orifice, a work contactor, said bar having a reduced portion in its length forming a resilient springlike section upon which said work contactor is carried for swinging movement about an axis transverse said bar, said work contactor extending in one direction from said axis, and means connected to said work contactor extending in the other direction from said axis for movement about said axis and operatively associated with said orifice for control of the orifice by swinging movements of the work contactor upon its contact with the workpiece.

3. A work gauging head adapted for physical contact with an object to be measured comprising an elongated carrying member, means for supporting said member adapted for mounting in a fixture, an outlet orifice on said member, passage means connected to said orifice, a movable arm carried by said carrying member having a portion thereof adjacent its inner end located in close proximity to said outlet for control thereof, said carrying member having a transverse groove in its surface forming a reduced springlike portion displaced along said member in one direction from said orifice, said arm being supported adjacent its outer end by said reduced portion for swinging movement about an axis transverse said member and a work contactor forming a continuation of said arm in the same direction beyond said axis for movement of the arm about said axis and control of the orifice upon contact of the work contactor with the workpiece surface, said carrying member having a projection cooperating with the inner end of said arm located in the plane of its swinging movement to limit its swinging movement.

4. A work gauging head adapted for physical contact with an object to be measured comprising an elongated and unitary carrying member, the inner end of said carrying member being adapted for connection to a supporting means, an outlet orifice in one surface of said carrying member, a passage in said carrying member extending from the other side thereof to said outlet orifice, a transverse groove of substantial depth in the other surface of said carrying member adjacent its outer end, a unitary arm fastened to said carrying member at its outer end and extending along the first mentioned surface thereof slightly beyond said outlet orifice towards the inner end of said member and having a portion thereon located in close proximity to said outlet orifice for control thereof, a work contactor fastened to the outer end of said arm for swinging movement of said arm about the transverse axis formed by said transverse groove in said carrying member upon its contact with a workpiece surface, and a projection formed in said carrying member adjacent to and disposed about the inner end of said arm in the plane of its swinging axis for limiting its swinging about said transverse axis upon movement of said work contactor by a workpiece surface.

5. A work gauging head adapted for physical contact with an object to be measured comprising an elongated carrying member having a resilient connection adjacent its inner end, support means for the inner end of the member, an outlet orifice in said member, a passage connected to said orifice, a work contactor, means resiliently mounting said work contactor at the outer end of said member for swinging movement relative to said member, means connected to said work contactor and operatively associated with said orifice for control thereof upon movement of the work contactor and an adjustment means extending along said member, fixed to said member at its inner end, and carrying an adjustable element contacting said member at a point adjacent its outer end for adjustably biasing said head about said inner resilient connection to obtain fine adjustments of the work contactor relative to the support means.

6. A work gauging head adapted for physical contact with an object to be measured comprising an elongated and unitary carrying member having a reduced section adjacent its inner end formed by a transverse groove of substantial depth in one surface thereof, said inner end being adapted for mounting in a support means, an outlet orifice in said member on said one surface, a passage through said member connected to said orifice, a transverse groove in the other surface of the said member adjacent its outer end forming a reduced springlike portion, a work contactor connected to said arm at its outer end for swinging movement about the transverse axis formed by the second mentioned transverse groove, means connected to said work contactor and operatively associated with said orifice for control thereof upon movement of the work contactor and an adjustment means comprising a rigid bar along the other surface of said member, fixed to said member at its inner end and carrying an adjustable element contacting said member at a point adjacent its outer end but within said second mentioned transverse groove for adjustably biasing said head about the inner reduced section thereof to obtain fine adjustments of the work contactor relative to the support.

7. A work gauging head adapted for physical contact with an object to be measured comprising an elongated carrying member having a resilient connection adjacent its inner end, means for supporting the member at its inner end, an outlet orifice in said member on one surface thereof, passage means connected to said orifice, a work contactor, means resiliently connecting said work contactor at the outer end of said member for swinging movements relative to said member about an axis transverse thereof, an arm connected to said work contactor and extending along said one surface of said carrying member in juxtaposed relationship thereto for control of the orifice upon movement of the work contactor, and an adjustment means comprising an element fixed to said member at its inner end and carrying an adjustable means contacting said member adjacent its outer end for adjustably biasing said head about the first mentioned resilient connection to obtain fine adjustments of the work contactor relative to the support.

8. A work gauging head adapted for physical contact with an object to be measured comprising an elongated carrying member having a resilient connection adjacent its inner end, said inner end being adapted for mounting in a support means, an outlet orifice in said member on one surface thereof, a passage to said member connected to said orifice, a tubular connecting means mounted in said passage and extending therebeyond for connection to an air supply and an air gauge, a work contactor, means resiliently mounting said work contactor at the outer end of said member for swinging movements relative to said member about an axis transverse thereof, means connected to said work contactor and operatively associated with said orifice for control thereof upon movement of the work contactor and an adjustment means comprising a rigid bar along the other surface of said member, fixed to said member at its inner end, having a hole therethrough through which said tubular connecting means is projected with clearance, and carrying a screw member threaded therein contacting said member at a point adjacent its outer end but within said means for mounting the work contactor, for adjustably biasing said head about said inner resilient connection relative to said rigid bar to obtain fine adjustments of the work contactor relative to its supported inner end.

References Cited in the file of this patent

UNITED STATES PATENTS

| | | |
|---|---|---|
| 2,001,447 | Balsiger | May 14, 1935 |
| 2,284,325 | Kline | May 26, 1942 |
| 2,320,192 | Palmer | May 25, 1943 |
| 2,490,375 | Rupley | Dec. 6, 1949 |
| 2,492,656 | Rupley | Dec. 27, 1949 |
| 2,545,881 | Graham | Mar. 20, 1951 |
| 2,635,748 | Arlin | Apr. 21, 1953 |
| 2,712,181 | Mahlmeister | July 5, 1955 |
| 2,736,101 | Blume | Feb. 28, 1956 |

FOREIGN PATENTS

| | | |
|---|---|---|
| 341,365 | Great Britain | Jan. 15, 1931 |
| 904,443 | France | Feb. 26, 1945 |